United States Patent [19]

Hsu

[11] Patent Number: 4,548,192

[45] Date of Patent: Oct. 22, 1985

[54] COLLAPSIBLE CAMP STOVE

[76] Inventor: Wen Y. Hsu, No. 6, La. 129, Fu-Kang St., Shin Lin District, Taipei, Taiwan

[21] Appl. No.: 628,493

[22] Filed: Jul. 6, 1984

[51] Int. Cl.[4] .............................................. A47J 37/00
[52] U.S. Cl. .................... 126/25 R; 126/9 R; 126/38
[58] Field of Search ............... 126/59, 25 R, 29, 9 R, 126/9 B, 38

[56] References Cited

U.S. PATENT DOCUMENTS

| 1,323,567 | 12/1919 | Ball ........................................ 126/38 |
| 1,626,035 | 4/1927 | Hanson ................................... 126/38 |
| 1,943,585 | 1/1934 | Cummins et al. ................. 126/9 B X |
| 2,714,465 | 8/1955 | Blair ................................... 126/38 X |
| 3,288,050 | 11/1966 | Saiki ................................... 126/25 R |
| 3,481,267 | 12/1969 | Saiki ................................... 126/25 R |
| 3,610,225 | 10/1971 | Schwantes ......................... 126/25 R |
| 3,812,839 | 5/1974 | Helgeson .............................. 126/38 |
| 4,106,473 | 8/1978 | Wandel .............................. 126/25 R |

Primary Examiner—Larry Jones
Attorney, Agent, or Firm—Lowe King Price & Becker

[57] ABSTRACT

The present invention relates to a collapsible camp stove and in particular to one comprising a folding casing, two leg members engageable with the bottom of the foldable casing, two grips engageable with two sides of the foldable casing, a base plate disposed in the casing, a grate located in the casing, and two roasting frames placed on the top of the casing.

4 Claims, 6 Drawing Figures

COLLAPSIBLE CAMP STOVE

BACKGROUND OF THE INVENTION

1. Field of the Invention

This invention relates to a camp stove, and in particular to a collapsible camp stove which can be carried about.

2. Description of the Prior Art

As a result of rapid population growth, more and more people are engaging in camping as a leisure activity to relieve day to day stress. Accordingly, the need has arisen for a stamp stove which is collapsible, simple in construction, and easy to use. Although attempts have been made to provide such a camp stove, none was led to satisfactory results.

SUMMARY

It is, therefore, an object of the present invention to provide a collapsible camp stove which can be carried about.

It is another object of the present invention to provide a collapsible camp stove which is convenient to use.

It is still another object of the present invention to provide a collapsible camp stove which is lightweight.

It is still another object of the present invention to provide a collapsible camp stove which is easy to assemble.

It is still a further object of the present invention to provide a collapsible camp stove which is of simple construction.

It is a further object of the present invention to provide a collapsible camp stove which can be produced with low labor costs.

With the above and other objects in view, as will appear to those skilled in the art from the present disclosure, this invention includes all features in said disclosure which are novel over the prior art and which are not claimed in any separate application.

In the accompanying drawings, in which certain modes of carrying out the present invention are shown for illustrative purposes:

DETAILED DESCRIPTION OF THE PREFERRED EMBODIMENT

Figure 1:
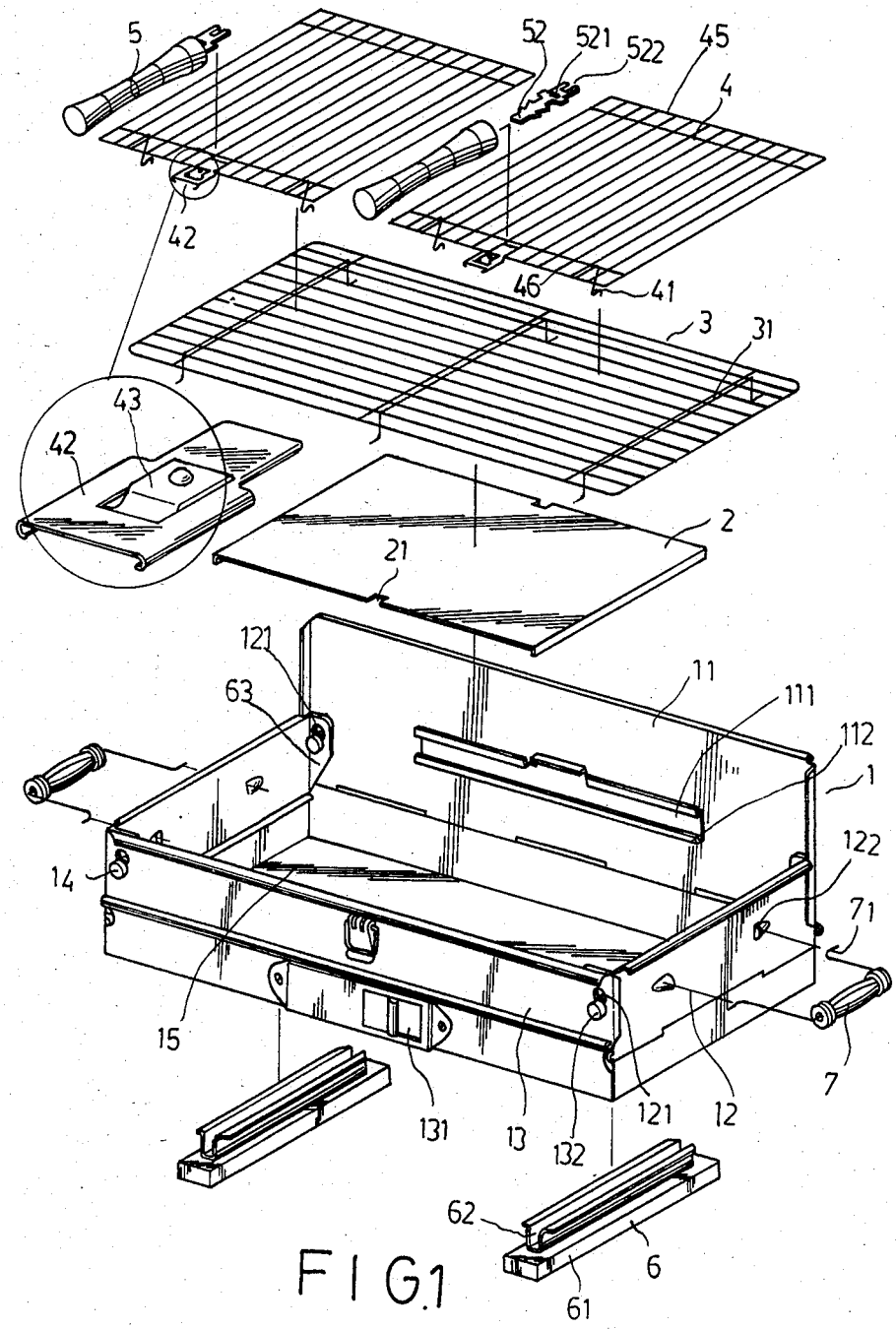
FIG. 1 is an exploded view of a collapsible camp stove according to a preferred embodiment of the present invention.
Figure 2:
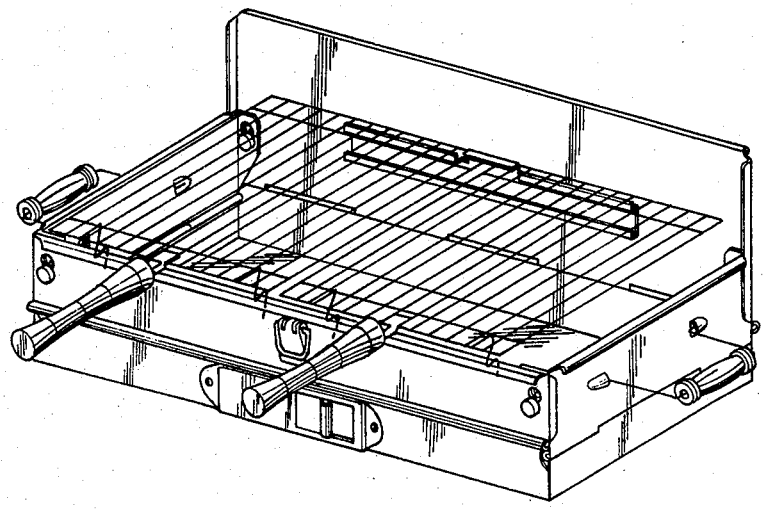
FIG. 2 shows the using state of the collapsible camp stove.
Figure 3:
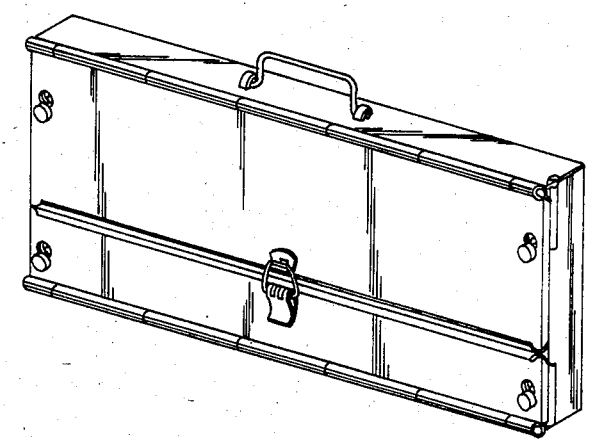
FIG. 3 shows the collapsed state of the collapsible camp stove.
Figure 4:
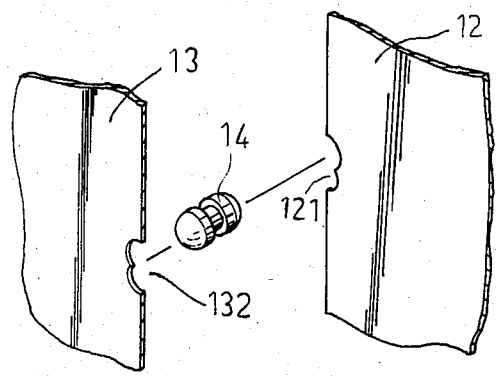
FIG. 4 is a fragmentary view showing the connection between the front plate and the side plate.
Figure 5:
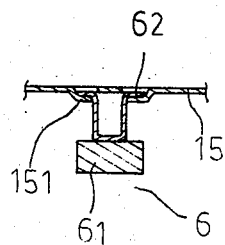
FIG. 5 is a partial sectional view showing the connection between the leg member and the bottom of the rectangular main body.
Figure 6:
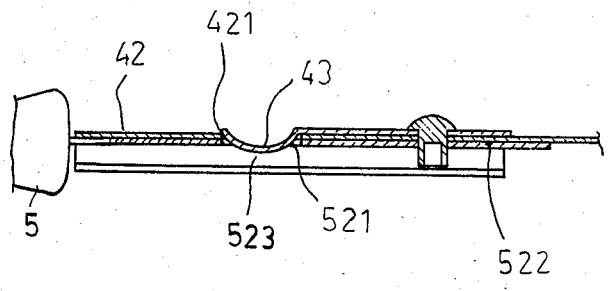
FIG. 6 is a partial sectional view showing the connection between the handle and the grate.

Referring now to the drawings and in particular to FIG. 1 thereof, the collapsible camp stove according to the present invention comprises a folding casing (1), two leg members (6), two grips (7), a base plate (2), a grate (3), and two roasting frames (4). The casing (1) is substantially composed of a rectangular main body (15), two side plates (12), a rear plate (11) and a front plate (13). The side plates (12), the front plate (13) and the rear plate (11) are hinged to the upper edges of the main body (15) so that the folding casing (1) can be folded into a relatively small package when not in use. Each of the side plates (12) has two flanges (63) each having a locking hole (121), and two holes (122) engageable with the grip (7). The front plate (13) is formed with two holes (132) in each of which is slidably mounted a fastener (14). The fastener (14) is designed so that it will connect the side plate (12) to the front plate when moved downwards (as shown in FIG. 4). An air baffle (131) is fitted in the front plate (13), whereby the flow rate of air entering into the folding casing (1) may be controlled. The rear plate (11) is also formed with two holes (132), similar to the two holes (132) in front plate (13), in each of which is slidably mounted a fastener (14) adapted to the locking hole (121) of the flange (63) of the side plate (12). On the inner surface of the rear plate (11) there is an upper rail (111) and a lower rail (112). The rectangular main body (15) is provided at its bottom surface with two rails (151) (as shown in FIG. 5). The leg member (6) consists of a block (61) and a frame (62) secured on the block (61). The frame (62) is engageable with the rail (151) of the main body (15). The base plate (2), which is serves to receive ash dropping from fire, comes with two notches (21). The grate (3) is fitted with three supporting members (31) rigidly attached to the bottom side thereof. The middle one of the supporting members (31) is adapted to the notches (21) of the base plate (2). The roasting frame (4) has two hook members (41) for engaging with the upper edge of the front plate (13). Between the two hook members (41) there is a female locking member (42) having a spring plate (43) screwed thereon. The handle (5) is provided with a male locking member (52) partially inserted therein. The male locking member (52) has a slot (521) and two prongs (522) which are designed so that when the male locking member (52) is inserted into the female locking member (42), the slot (521) will engage with the spring plate (43).

To assemble the collapsible camp stove, first turn up the side plates (12), the front plate (13) and the rear plate (11). Engage the fasteners (14) of the front plate (13) and the rear plate (11) with the locking holes (121) of the side plates (12). Insert the leg members (6) into the rails (151) of the rectangular main body (15) so as to help dissipate the heat evolved from fire. Dispose the base plate (2) in the main body (12). Put the grate (3) in the main body (12), with the middle supporting member (31) engaged with the notches (21) of the base plate (2). Place several pieces (not shown) of charcoal on the grate (3) and ignite them. Connect the handles (5) with the roasting frames (4). Then, put the roasting frames (4) on the folding casing (1), with rear edge (45) and the hook members (41) respectively supported on the rail (111) and the upper edge of the front plate (13). The collapsible camp stove is now in condition for use. For conveniently carrying the collapsible camp stove, especially while it is hot, a user may lift it by means of grips (7) attached thereto by inserting their ends (71) into holes (122) provided therefor in side plates (12). When not in use, simply reverse the procedures just described above to form a compact case.

In case the fire is not large enough, simply place the roasting frame (4) on the folding casing (1) with the rear edge (45) of the roasting frame (4) and the front edge

(46) respectively located on the lower rail (112) and the top edge of the front plate (13).

Although this invention has been described with a certain degree of particularity, it is understood that the present disclosure has been made by way of example only and that numerous changes in the construction and arrangement of parts may be resorted to without departing from the spirit and scope of the invention as hereinafter claimed.

I claim:

1. A collapsible camp stove that folds into a self-contained substantially rectangular package, comprising:
   a rectangular main body;
   a front plate and a rear plate, each hinged along one of its sides to said main body and each having a hole of predetermined shape adjacent each of two opposite sides normal to said hinged side;
   four fasteners, one of said fasteners being slidably retained within each of said holes in said front and rear plates respectively;
   two side plates, each hinged along one of its sides to opposite sides of said main body and each formed with end flanges each provided with a locking hole of predetermined shape to receive a portion of one of said fasteners when placed adjacent thereto, said fasteners and said locking holes being so positioned that when said side plates are moved to form corners with said front and rear plates, respectively, adjacent plates become connected when said fasteners are moved downwards and are subsequently disconnected when said fasteners are moved upward;
   fuel support means for supporting burning fuel within and above the inside bottom surface of said main body;
   base plate means, underneath said burning fuel and above the inside base surface of said main body, for receiving ash and cinders from combustion of said burning fuel;
   combustion rate control means, attached to said main body, for controlling the rate at which combustion of said fuel is carried out on said fuel support means; and
   food support means, for supporting food items at a predetermined height above said burning fuel, supported by said rear plate and said front plate.

2. A collapsible camp stove as claimed in claim 1, further comprising:
   stove support means for holding said main body above an underlying support surface.

3. A collapsible camp stove as claimed in claim 1, further comprising:
   first stove lifting means for lifting said stove while said fuel is burning within, and
   second stove lifting means for lifting said stove when collapsed into said substantially rectangular package.

4. A collapsible camp stove that folds into a self-contained substantially rectangular package comprising:
   a folding casing, composed of a rectangular main body, a front plate and a rear plate each having two holes in each of which is slidably mounted a fastener, and two side plates each formed at each vertical side with a flange having a locking hole which is positioned such that said side plates are connected when put together respectively with said front plate and said rear plate and said fasteners slidably mounted in the holes of said front plate and said rear plate are moved downwards, such that said side plates disconnect from said front plate and said rear plate when said fasteners slidably mounted in the holes of said front plate and said rear plate are moved upwards allowing said folding casing to be folded into a compact case, said rear plate being provided with an upper rail and a lower rail, said rectangular main body being fitted in the front with an air baffle for controlling air flow entering into said folding case for combustion of fuel therein and further provided in the bottom with two rails;
   two leg members, each engageable with one of said two rails of said rectangular main body;
   two grips, each engageable with one of said two side plates;
   a base plate, disposed inside said rectangular main body, said base plate having a notch at each of two opposite sides;
   a grate, having three supporting members rigidly attached to the bottom thereof, the middle one of said supporting members being engageable with said two notches of said base plate;
   two roasting frames, each provided at the bottom with two hook members engageable with the upper edge of said front plate of said folding casing and each having a female locking member with a spring plate secured thereon; and
   two handles, each having a male locking member provided with two prongs and a slot engageable with said spring plate of said female member.

* * * * *